3,207,748
NITROPHENYLAZO-2-HYDROXYNAPHTHALENE-3-CARBOXYLIC ACID AMINE DYESTUFFS
Werner Bossard and Hans E. Wegmüller, Riehen, near Basel, Switzerland, assignors to J. R. Geigy A.-G., Basel, Switzerland
No Drawing. Filed Nov. 14, 1962, Ser. No. 237,761
Claims priority, application Switzerland, May 30, 1962, 6,580/62
6 Claims. (Cl. 260—204)

The present invention concerns new monoazo dyestuffs which are difficulty soluble in water, processes for the production thereof, processes for the dyeing of hydrophobic organic fibres using the new dyestuffs and, as industrial product, the material dyed with the aid of these dyestuffs.

It has been found that new difficulty water soluble monoazo dyestuffs are obtained by coupling (a) a diazonium compound of the benzene series which contains at the benzene nucleus at least one electrophilic substituent which does not dissociate acidically in water, at least one such substituent being in either o- or p-position to the azo group, with (b) a compound of formula

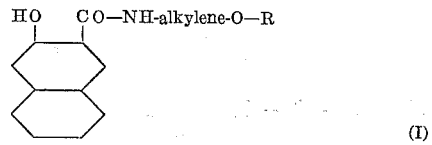
(I)

wherein R represents a non-olefinic hydrocarbon radical with not more than 8 carbon atoms, i.e. an alkyl, benzyl or phenyl radical which may be further substituted, and
"Alkylene" represents a lower alkylene radical with maximally 4 and preferably with 2 to 4 carbon atoms, to form a dyestuff of the general formula

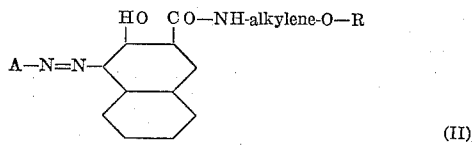
(II)

wherein A represents a phenyl radical which contains at least one electrophilic substituent which does not dissociate acidically in water, at least one such substituent being in either o- or p-position to the azo group, R and "alkylene" have the meanings given in Formula I, and the components are so chosen that the dyestuff does not contain any water solubilising groups which dissociate acid in water.

The term "electrophilic substituent which does not dissociate acid in water" as used in this specification and the appended claims, of which substituents there are preferably not more than three present in A, means the nitro, cyano and trifluoromethyl group, the carbalkoxy groups havings not more than 8 carbon atoms, such as carboxylic acid methyl, ethyl or butyl ester groups, the unsubstituted, mono- and disubstituted carbamyl groups with maximally 8 carbon atoms; the unsubstituted, mono- and disubstituted sulphonic acid amide groups, wherein "amide" is a radical with not more than 8 carbon atoms, 1 nitrogen atom and 0 to 1 oxygen atom, such as sulphonic acid dimethylamide, diethylamide, dibutylamide, phenylmethylamide, piperidide and morpholide groups; phenoxy sulphonyl, methoxyphenoxy sulphonyl and chlorophenoxy sulphonyl radicals with maximally 8 carbon atoms; the acyl groups with 2 to 8 carbon atoms such as acetyl, propionyl, butyrol, benzoyl groups; the halogens fluorine, chlorine and bromine.

Further optional substituents compatible with the aforesaid electrophilic substituent or substituents in the benzene nucleus of A and designated in this specification as "compatible substituents" are alkyl with maximally 8 carbon atoms, such as methyl, ethyl, propyl, isopropyl, tert. amyl, isooctyl; cyclohexyl, benzyl, phenyl, methylphenyl, chlorophenyl; alkoxy with maximally 4 carbon atoms such as methoxy and ethoxy, which may be optionally hydroxylated as, for instance, in 2-hydroxyethoxy; phenoxy, chlorophenoxy, methylphenoxy; acetylamino, chloroacetylamino, β-chloropropionylamino, benzoylamino, chlorobenzoylamino, chloromethylsulphonylamino, chlorotriazinylamino and chloropyrimidylamino groups.

Since the dyestuffs are difficulty soluble, as has already been stated, water solubilising groups which dissociate acid in water such as the —$SO_3H$ or the —COOH group are excluded.

Preferably A is a phenyl radical which contains one to two of the aforesaid electrophilic substituents which do not dissociate acid in water, in the o- and p-position to the azo group.

"Alkylene" in the Formulas I and II represents a lower alkylene radical with from 2 to 4 carbon atoms, such as the ethylene, propylene or the butylene radical.

The term "non-olefinic hydrocarbon radical with not more than 8 carbon atoms" as used for R in this specification and the appended claims, means alkyl and chloroalkyl, preferably with not more than 4 carbon atoms, for example, methyl, ethyl, 2-chloroethyl, propyl; alkoxyalkyl preferably with not more than 5 carbon atoms such as β-methoxyethyl or β-ethoxyethyl; benzyl, methylbenzyl, phenyl or an optionally further substituted phenyl radical, namely, a methylphenyl, chlorophenyl or methoxyphenyl radical.

Diazonium compounds usable according to the invention are derived, for example, from the following amines:

1-amino-2-nitro-benzene,
1-amino-2-nitro-4-methylbenzene,
1-amino-2-nitro-4-methoxybenzene,
1-amino-2-nitro-4-ethoxybenzene,
1-amino-2-nitro-4-chlorobenzene,
1-amino-2-nitro-benzene-4-sulphonic acid amide, -methylamide, -ethylamide, -dimethylamide, -diethylamide or N-phenyl-N-methylamide,
1-amino-2-nitro-4-trifluoromethylbenzene,
1-amino-4-nitrobenzene,
1-amino-4-nitro-2-methylbenzene,
1-amino-4-nitro-2-methoxybenzene,
1-amino-4-nitro-2-ethoxybenzene,
1-amino-4-nitro-2-chlorobenzene,
1-amino-4-nitro-2-bromobenzene,
1-amino-4-nitro-2-cyanobenzene,
1-amino-4-nitro-2,5-dichlorobenzene,
1-amino-4-nitro-2,6-dichlorobenzene,
1-amino-4-nitro-2,6-dibromobenzene,
1-amino-4-nitro-3-carboethoxybenzene,
1-amino-4-nitro-3-carbobutoxybenzene,
1-amino-2-nitro-4-carbo-diethylamide-benzene,
1-amino-2,4-dinitrobenzene,
1-amino-2,4-dinitro-6-chlorobenzene,
1-amnno-4-carboethoxybenzene,
1-amino-4-carbophenylbenzene,
1-amino-2,4-,1-amino-2,5- or 1-amino-3,4-dicyanobenzene,
1-amino-2-nitro-4-sulphophenoxybenzene,
1-amino-4-nitro-2-sulfo-2'-methylphenoxy benzene,
1-amino-2-nitro-4-sulfo-2'chlorophenoxybenzene,
1-amino-2-nitro-4-sulfo-3'-methoxyphenoxy-benzene,
1-amino-2,4-dinitro-6-fluorobenzene.

To produce the preferred dyestuffs in which A is a phenyl radical electrophilically substituted in the o- and p-position, for example 1-amino-2,4-dinitrobenzene and 1-amino-2-cyano-4-nitrobenzene are used.

As azo components of Formula I, condensation products of 2-hydroxynaphthalene - 3 - carboxylic acid and amines of Formula III

wherein "alkylene" and R have the meanings given in Formula I are used, which are produced by reaction of the chloride of 2-hydroxynaphthalene-3-carboxylic acid with the said amine of Formula III, such as β-methoxyethylamine, β-ethoxyethylamine, β-propyloxyethylamine, β-phenoxyethylamine, γ-methoxypropylamine, γ-ethoxypropylamine, γ-(2'-chloroethoxy) - propylamine, γ-phenoxypropylamine, γ-(o-chlorophenoxy)-propylamine, γ-(o-methylphenoxy)-propylamine, γ - benzyloxypropylamine, β-methoxyethoxy-ethylamine, β-ethoxyethoxy-ethylamine, γ-methoxyethoxy-propylamine, γ-ethoxyethoxy-propylamine, or δ-methoxybutylamine.

The coupling is performed by the usual methods, advantageously in a weakly acid medium, possibly in the presence of solubility promotors such as low aliphatic alcohols, e.g. ethylene glycol monomethyl or monoethyl ether, or amides of lower fatty acids, in particular dimethyl formamide.

Preferred dyestuffs of the invention correspond to the formula

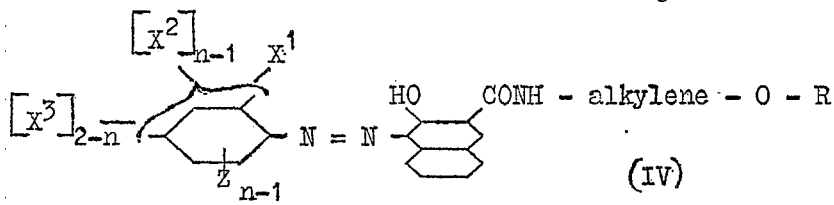

wherein $n$ is an integer ranging from 1 to 2, $X^1$ is nitro, $X^2$ is nitro, cyano, chloro or bromo, $X^3$ is hydrogen, trifluoromethyl, alkoxycarbonyl having a total of maximally 8 and preferably not more than 5 carbon atoms, N-alkyl-substituted carbamyl with maximally 8 carbon atoms, especially N,N-diethyl carbamyl, phenoxysulfonyl, methylphenoxysulfonyl, chlorophenoxysulfonyl, methoxyphenoxysulfonyl, or N-alkyl-substituted, N-phenyl-substituted and N-phenyl-N-alkyl-substituted sulfamyl, all of said sulfamyl radicals having not more than 8 carbon atoms, especially N,N-diethylsulfamyl and N-phenyl-N-methyl-sulfamyl, Z is hydrogen, chloro, bromo or fluoro, "Alkylene" is ethylene, propylene or butylene, i.e. an alkylene radical with 2 to 4 carbon atoms, especially 1,3-propylene, and R is a "non-olefinic hydrocarbon radical with not more than 8 carbon atoms," which means alkyl and chloroalkyl, preferably with not more than 4 carbon atoms, especially methyl, ethyl and chloroethyl; alkoxyalkyl with maximally 8 and preferably with not more than 5 carbon atoms, especially methoxyethyl and ethoxyethyl; benzyl, methylbenzyl, phenyl, methylphenyl, chlorophenyl and methoyxphenyl.

Particularly interesting among these preferred compounds are those of the formula

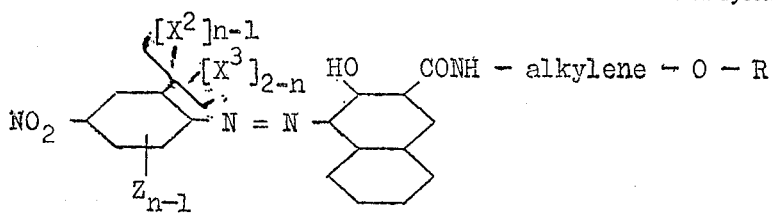

wherein $n$, $X_2$, $X_3$, Z, "alkylene" and R have the meanings given under formula IV.

Dyestuffs of the invention which are particularly valuable because of their excellent drawing power and fastness to light and sublimation are those of the formulas

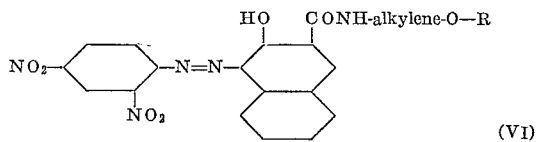

and

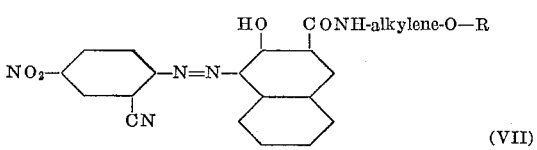

wherein R and "alkylene" have the meaning given under Formula IV.

Compared with the known azo compounds of the phenyl-azo - 2 - hydroxynaphthalene-3-carboxylic acid- alkyl, -hydroxyalkyl, -aralkyl, -cycloalkyl, or -arylamide series, the new dyestuffs according to the invention have a considerably improved drawing power onto polyglycol terephthalate fibres. The dyeings on polyester fibres with compounds according to the invention having two electronegative substituents in the diazo component, one of which is a nitro group in p-position to the azo bridge and the other is a nitro or cyano group in o-position to the azo bridge, also differ from dyeings obtained with known dyestuffs in their considerably increased fastness to light. Polyester fibres dyed with the last-mentioned dyestuffs according to the invention are distinguished by their excellent drawing power and very good fastness to rubbing, light and sublimation.

The dyestuffs accordings to the invention are brought into easily distributable form by milling with dispersion agents. Suitable dispersing agents are, e.g., anionic agents such as alkylaryl sulphonates, condensation products of aldehydes, i.e., formaldehyde and naphthalene sulphonic acids, lignin sulphonates, or non-ionogenic ones such as fatty alcohol polyglycol ethers. Mixtures of these dispersing agents are used with advantage.

The dyestuffs according to the invention are suitable for the dyeing of hydrophobic synethic textile fibres from aqueous dispersion, e.g., for the dyeing of cellulose di- and tri-acetate, particularly however, for the dyeing of high molecular esters of aromatic polycarboxylic acids and polyfunctional alcohols, for example, ethylene glycol terephthalates such as "Terylene," "Dacon," "Tergal," "Trevira," or "Kodel,' a high molecular xylenedial terephthalate. The dyestuffs can also be used, however, for the dyeing of synthetic polyamide fibres such as "nylon" or of "Perlon."

The dyeing of polyesters fibres with aqueous dispersions of dyestuffs according to the invention is performed advantageously at temperatures of over 100° C. under pressure. However, the dyeing can also be performed at the boiling point of water in the presence of colour carriers such as, e.g. phenylphenol, polychlorobenzene compounds or similar auxiliaries.

In individual cases, the drawing power of the dyestuffs can be even improved by mixing two or more of the dyestuffs according to the invention.

Depending on the composition of the dyestuffs, yellow orange and red dyeings can be attained on polyesters fibres which have very good fastness to rubbing, sublimation and light.

The following examples illustrate the invention. Where not otherwise stated, parts are given as parts by weight. The temperatures are in degrees centigrade. The relationship of parts by weight to parts by volume is as that of grammes to cubic centimetres.

EXAMPLE 1

A fine suspension of 13.8 parts of 1-amino-2-nitrobenzene in 500 parts of water, 60 parts of 36% hydrochloric acid and 5 parts of cetyl polyglycol ether are diazotised in the usual way at 5–7° by the addition of 6.9 parts of sodium nitrite. A solution of 32.1 parts of 2-hydroxynaphthalene-3-carboxylic acid-γ-phenoxypropylamide in 150 parts by volume of 2 N sodium hydroxide solution and 300 parts of water is added dropwise to the clear diazonium salt solution so prepared. The mineral acid is then buffered by the addition of sodium acetate. On completion of the coupling, the precipitated dyestuffs of the formula

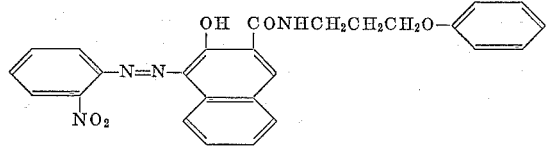

is filtered off, washed with water, dried in vacuo at 60–70° and milled with a mixture of a condensation product of naphthalene-2-sulphonic acid with formaldehyde and a lignin sulphonate. It is a red powder which, in aqueous dispersion possibly in the presence of a carrier, dyes polyglycol terephthalate fibres such as "Dacron" (E. J. du Pont de Nemours, Wilmington, Del., U.S.A.) in pure scarlet shades. The dyeings are fast to washing, rubbing and sublimation.

The 2-hydroxynaphthalene-3-carboxylic acid-γ-phenoxypropylamide is obtained by reacting 2-hydroxynaphthalene-3-carboxylic acid chloride with γ-phenoxypropylamine.

If in the above example, the 32.1 parts of 2-hydroxynaphthalene-3-carboxylic acid-γ-phenoxypropylamide are replaced by 25.9 parts of 2-hydroxynaphthalene-3-carboxylic acid-β-ethoxyethylamide or by 33.5 parts of 2-hydroxynaphthalene-3-carboxylic acid-γ-benzyloxypropylamide and the coupling is performed under the conditions described, then dyestuffs are obtained which produce scarlet dyeings on polyglycol terephthalate fibres which have equally good properties.

EXAMPLE 2

25.9 parts of 2-hydroxynaphthalene-3-carboxylic acid-γ-methoxypropylamide are dissolved in 300 parts by volume of 1 N sodium hydroxide solution and the solution is poured, with vigorous stirring, into 60 parts of concentrated sulphuric acid, 400 parts of finely crushed ice, 200 parts of water and 5 parts of cetyl polyglycol ether. The diazonium salt solutions of 18.3 parts of 1-amino-2,4-dinitrobenzene, produced by dissolving 1-amino-2,4-dinitrobenzene in 50 parts of concentrated sulphuric acid and diazotising with the amount of nitrosyl sulphuric acid corresponding to 6.9 parts of sodium nitrite, is added dropwise at 0–5° to this fine dispersion. Sodium acetate is added to the reaction mixture to complete the coupling. The scarlet precipitate formed of the composition

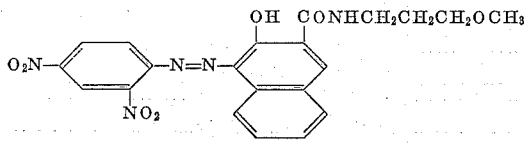

is filtered off and washed and dried in the usual way. A preparation produced by milling with a condensation product of naphthalene-2-sulphonic acid and formaldehyde, dyes polyglycol terephthalate fibres such as "Tergal" (Rhodiaceta, Lyons, France) from an aqueous dispersion, possibly in the presence of a carrier such as o-phenylphenol, in pure orange shades. The dyeings are distinguished by a high degree of fastness to light and sublimation.

The 2-hydroxynaphthalene-3-carboxylic acid-γ-methoxypropylamide used as starting material is obtained in the usual way by reacting 2-hydroxynaphthalene-3-carboxylic acid chloride with γ-methoxypropylamine in the presence of an acid binding agent.

Dyestuffs having similar properties are obtained if equivalent amounts of the diazo and coupling components given in the following Table I are coupled under the conditions described in the above example.

*Table 1*

| No. | Diazo component | Coupling component or mixture of coupling components | Shade on polyester fibres |
| --- | --- | --- | --- |
| 1 | 1-amino-2-nitro-4-chlorobenzene | 2-hydroxynaphthalene-3-carboxylic acid-γ-methoxy-propylamide. | Orange. |
| 2 | ___do___ | 2-hydroxy naphthalene-3-carboxylic acid-γ-(ethoxy-ethoxy)-propylamide. | Do. |
| 3 | 1-amino-4-nitro-2,6-dichlorobenzene | 2-hydroxynaphthalene-3-carboxylic acid-β-methoxy-ethylamide. | Do. |
| 4 | ___do___ | 2-hydroxynaphthalene-3-carboxylic acid-γ-ethoxy-propylamide. | Do. |
| 5 | ___do___ | 2-hydroxynaphthalene-3-carboxylic acid-γ-(methoxy-ethoxy)-propylamide. | Do. |
| 6 | 1-amino-4-nitro-2,5-dichlorobenzene | 2-hydroxynaphthalene-3-carboxylic acid-β-methoxy-ethylamide. | Do. |
| 7 | ___do___ | 2-hydroxynaphthalene-3-carboxylic acid-γ-(o-methyl-phenoxy)-propylamide. | Do. |
| 8 | 1-amino-2,4-dinitrobenzene | 2-hydroxynaphthalene-3-carboxylic acid-β-phenoxy-ethylamide. | Do. |
| 9 | ___do___ | 2-hydroxynaphthalene-3-carboxylic acid-γ-phenoxy-propylamide. | Do. |
| 10 | ___do___ | 2-hydroxynaphthalene-3-carboxylic acid-β-propyloxy-ethylamide. | Do. |
| 11 | ___do___ | {2-hydroxynaphthalene-3-carboxylic acid-γ-methoxy-propylamide. / 2-hydroxynaphthalene-3-carboxylic acid-γ-phenoxy-propylamide.} | Do. |
| 12 | 1-amino-2,4-dinitro-6-chlorobenzene | 2-hydroxynaphthalene-3-carboxylic acid-β-methoxy-ethylamide. | Do. |
| 13 | ___do___ | 2-hydroxynaphthalene-3-carboxylic acid-γ-methoxypropyl amide. | Do. |
| 14 | ___do___ | 2-hydroxynaphthalene-3-carboxylic acid-β-(methoxy-ethoxy)-ethylamide. | Do. |

Table 1—Continued

| No. | Diazo component | Coupling component or mixture of coupling components | Shade on polyester fibres |
|---|---|---|---|
| 15 | 1-amino-2-nitro-4-trifluoromethylbenzene | 2-hydroxynaphthalene-3-carboxylic acid-γ-methoxy-propylamide. | Orange. |
| 16 | do | 2-hydroxynaphthalene-3-carboxylic acid-γ-phenoxy-propylamide. | Do. |
| 17 | 1-amino-2-nitrobenzene-4-sulphonic acid diethylamide. | 2-hydroxynaphthalene-3-carboxylic acid-β-phenoxy-ethylamide. | Do. |
| 18 | do | 2-hydroxynaphthalene-3-carboxylic acid-γ-ethoxy-propyl-amide. | Do. |
| 19 | do | 2-hydroxynaphthalene-3-carboxylic acid-γ-benzyloxy-propylamide. | Do. |
| 20 | 1-amino-4-nitro-3-carbobutoxybenzene | 2-hydroxynaphthalene-3-carboxylic acid-γ-methoxy-propylamide. | Scarlet. |
| 21 | do | 2-hydroxynaphthalene-3-carboxylic acid-γ-(o-methylphen-oxy)-propylamide. | Do. |
| 22 | 1-amino-2,4-dicyanobenzene | 2-hydroxynaphthalene-3-carboxylic acid-γ-methoxy-propylamide. | Do. |
| 23 | do | 2-hydroxynaphthalene-3-carboxylic acid-γ-(methoxy-ethoxy)-propylamide. | Do. |
| 24 | 1-amino-4-nitro-2-bromo-benzene | 2-hydroxynaphthalene-3-carboxylic acid-γ-methoxy-ethoxypropylamide. | Orange. |
| 25 | 1-amino-2-nitrobenzene-4-carbocylic acid-di-ethyla-mide. | do | Do. |
| 26 | 1-amino-2-nitrobenzene-4-sulfonic acid-N-phenyl-N-methylamide. | 2-hydroxynaphthalene-3-carboxylic acid-γ-methoxy-propylamide. | Do. |
| 27 | 1-amino-2,4-dinitro-6-bromo-benzene | do | Do. |
| 28 | 1-amino-4-nitro-2,6-dibromo-benzene | 2-hydroxynaphthalene-3-carboxylic acid-γ-ethoxy-pro-pylamide. | Do. |
| 29 | 1-amino-2-nitrobenzene-4-sulfonic acid-phenyl-ester | 2-hydroxynaphthalene-3-carboxylic acid-γ-methoxy-propylamide. | Do. |
| 30 | 1-amino-2-nitrobenzene-4-sulfonic acid-(2′-methyl-phenyl)-ester. | do | Do. |
| 31 | 1-amino-4-nitrobenzene-2-sulfonic acid-(3′-methoxy-phenyl)-ester. | 2-hydroxynaphthalene-3-carboxylic acid-γ-methoxy-ethoxypropylamide. | Do. |
| 32 | 1-amino-2-nitro-benzene-4-sulfonic acid-(2′-chloro-phenyl)-ester. | 2-hydroxynaphthalene-3-carboxylic acid-γ-phenoxy-propylamide. | Do. |
| 33 | 1-amino-2,4-dinitro-6-fluorobenzene | do | Do. |
| 34 | 1-amino-2,4-dinitrobenzene | 2-hydroxynaphthalene-3-carboxylic acid-ω-methoxy-butylamide. | Do. |
| 35 | 1-amino-2-cyano-4-nitrobenzene | do | Do. |

EXAMPLE 3

25.9 parts of 2-hydroxynaphthalene-3-carboxylic acid-γ-methoxypropylamide are dissolved hot in 200 parts of dimethyl formamide and the solution is poured, while stirring vigorously, into 20 parts of concentrated sulphuric acid, 300 parts of finely crushed ice, 300 parts of water and 6 parts of cetyl polyglycol ether. The diazonium salt solution of 16.3 parts of 1-amino-4-nitro-2-cyanobenzene is added dropwise at 0–5° to the fine dispersion prepared, whereupon a scarlet red precipitate is formed. This is filtered off and washed and dried in the usual way. The composition of the dyestuff obtained corresponds to the formula

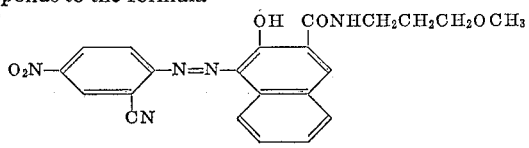

After milling this dyestuff with a condensation product of naphthalene-(2)-sulphonic acid and formaldehyde, it dyes polyglycol terephthalate fibres such as "Trevira" (Farbwerke Hoechst, Frankfurt am Main, Germany) from an aqueous dispersion in orange shades which are fast to washing, light and sublimation.

The diazonium salt solution used is produced as follows: 16.3 parts of 1-amino-4-nitro-2-cyanobenzene are added at 0–5° to 200 parts of a mixture of concentrated sulphuric acid and nitrosyl sulphuric acid corresponding to 6.9 parts of sodium nitrite. To complete the diazotisation, the reaction mixture is stirred overnight at 0–5°.

Dyestuffs having similarly good properties are obtained if, in the above example, instead of the 25.9 parts of 2-hydroxy-naphthalene-3-carboxylic acid-γ-methoxypropylamide, 27.3 parts of 2-hydroxynaphthalene-3-carboxylic acid-γ-ethoxypropylamide or 30.3 parts of 2-hydroxy-naphthalene - 3 - carboxylic acid-γ-methoxyethoxypropylamide are used and coupled with the diazo component mentioned under the conditions described.

EXAMPLE 4

2 parts of the dyestuff obtained according to Example 2 are dispersed in 4000 parts of water. 12 parts of the sodium salt of o-phenylphenol and 12 parts of diammonium phosphate are added to this dispersion as carrier and 100 parts of polyglycol terephthalate yarn are dyed for 1½ hours at 95–98°. The dyeing is rinsed and aftertreated with dilute sodium hydroxide solution and a dispersing agent.

In this way, an orange dyeing is obtained which is fast to washing, light and sublimation.

If, in the above example, the 100 parts of polyglycol terephthalate yarn are replaced by 100 parts of cellulose triacetate fabric and dyeing is performed under the conditions described and afterwards the goods are rinsed with water, then an orange dyeing is obtained which is distinguished by a high degree of fastness to washing and sublimation.

EXAMPLE 5

In a pressure dyeing apparatus, 2 parts of the dyestuff obtained according to Example 3 are finely suspended in 2000 parts of water which contains 4 parts of oleyl polyglycol ether. The pH of the dyebath is adjusted to 6–6.5 with acetic acid.

100 parts of polyglycol terephthalate fabric are entered at 50°, the bath is heated within 30 minutes to 140° and dyeing is performed for 50 minutes at this temperature. The dyeing is then rinsed with water, soaped and dried. Under these conditions, an orange dyeing is obtained which is fast to washing, perspiration, light and sublimation.

EXAMPLE 6

Polyglycol terephthalate fabric (such as "Dacron" of E. I. du Pont de Nemours, Wilmington, Del., U.S.A.) is impregnated in a foulard at 40° with a liquor of the following composition:

20 parts of the dyestuff obtained according to Example 2 finely dispersed in 7.5 parts of sodium alginate,
20 parts of triethanolamine,
20 parts of octylphenol-polyglycol ether, and
900 parts of water.

The fabric, wrung out to 100% content, is dried at 100° and the dyeing is then fixed for 30 seconds at a temperature of 210°. The dyed goods are rinsed with water, soaped and dried. Under these conditions, an orange dyeing is obtained which is fast to washing, rubbing, light and sublimation.

The dyestuffs described in the other examples produce dyeings of similarly satisfactory quality by this process.

What is claimed is:

1. A compound of the formula

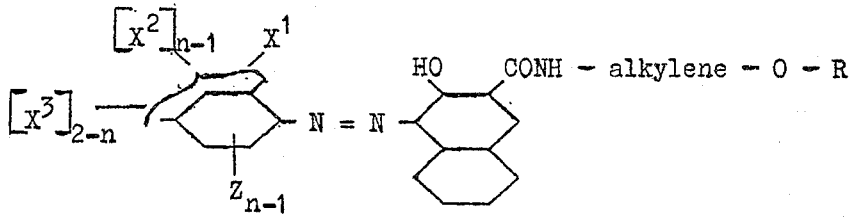

wherein $n$ is an integer ranging from 1 to 2, $X^1$ is nitro, $X^2$ is a member selected from the group consisting of nitro, cyano, chloro and bromo, $X^3$ is a member selected from the group consisting of hydrogen, trifluoromethyl, lower alkoky-carbonyl, N-lower alkyl-substituted carbamyl, phenoxysulfonyl, methylphenoxysulfonyl, chlorophenoxysulfonyl, methoxyphenoxysulfonyl and N-lower alkyl-substituted, N-phenyl-substituted and N-phenyl-N-lower alkyl-substituted sulfamyl, Z is a member selected from the group consisting of hydrogen, chloro, bromo and fluoro, "alkylene" is a straight chain alkylene radical with from 2 to 4 carbon atoms, and R is a member selected from the group consisting of alkyl and chloroalkyl with maximally 8 carbon atoms, alkoxyalkyl with maximally 8 carbon atoms, benzyl, methylbenzyl, phenyl, methylphenyl, chlorophenyl and methoxyphenyl.

2. A compound of the formula

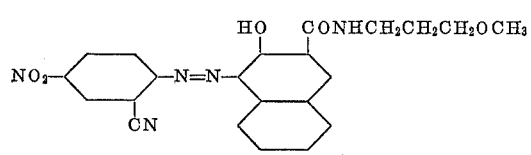

3. A compound of the formula

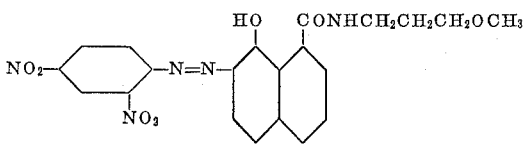

4. A compound of the formula

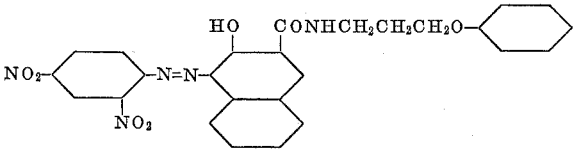

5. A compound of the formula

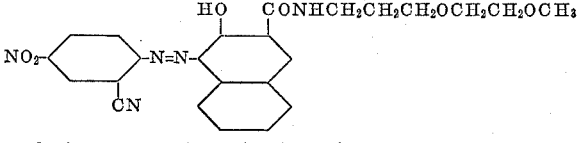

6. A compound of the formula

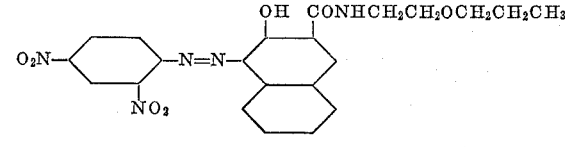

References Cited by the Examiner

UNITED STATES PATENTS 2,112,403   3/38   Krzikalla et al. _____ 260—204
3,001,982   9/61   Krzikalla et al. _____ 260—204 XR

FOREIGN PATENTS 316,752   12/56   Switzerland.

CHARLES B. PARKER, *Primary Examiner.*

UNITED STATES PATENT OFFICE
CERTIFICATE OF CORRECTION

Patent No. 3,207,748                      September 21, 1965

Werner Bossard et al.

It is hereby certified that error appears in the above numbered patent requiring correction and that the said Letters Patent should read as corrected below.

Column 10, lines 2 to 7, the right-hand side of the formula should read as shown below instead of as in the patent:

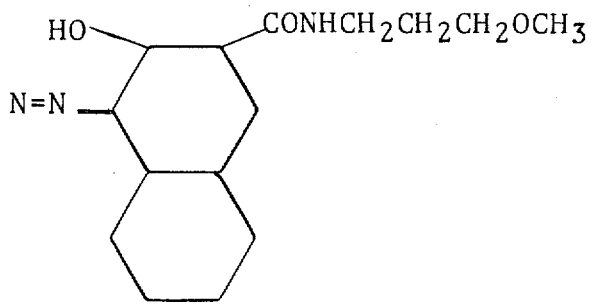

Signed and sealed this 5th day of September 1967.

(SEAL)
Attest:

ERNEST W. SWIDER                      EDWARD J. BRENNER
Attesting Officer                    Commissioner of Patents